Figure 2:
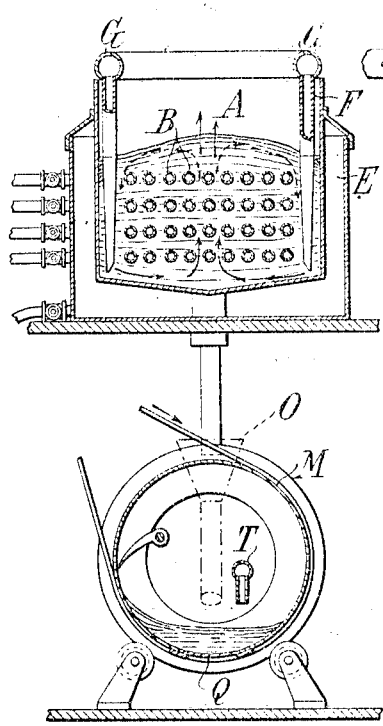

H. & C. H. CAMPBELL.
C. H. CAMPBELL, EXECUTOR OF J. H. CAMPBELL, DEC'D.
CONCENTRATING SYRUP.
APPLICATION FILED NOV. 27, 1903. RENEWED JULY 18, 1912.

1,053,784.

Patented Feb. 18, 1913.

WITNESSES:
Fred White
René Bruine

INVENTORS:
Joseph H. Campbell & Charles H. Campbell,
By Attorneys,
Arthur C. Fraser & Co.

UNITED STATES PATENT OFFICE.

JOSEPH H. CAMPBELL, OF NEW YORK, N. Y., AND CHARLES H. CAMPBELL, OF PHILADELPHIA, PENNSYLVANIA; CHARLES H. CAMPBELL EXECUTOR OF SAID JOSEPH H. CAMPBELL, DECEASED.

CONCENTRATING SYRUP.

1,053,784.  Specification of Letters Patent.  Patented Feb. 18, 1913.

Application filed November 27, 1903, Serial No. 182,933. Renewed July 15, 1912. Serial No. 710,286.

*To all whom it may concern:*

Be it known that we, JOSEPH H. CAMPBELL, residing in the city, county, and State of New York, and CHARLES H. CAMPBELL, residing in the city and county of Philadelphia and State of Pennsylvania, both citizens of the United States, have invented certain new and useful Improvements in Concentrating Syrups, of which the following is a specification.

In the processes now generally practised the syrup or juice after being clarified is concentrated by boiling in vacuum pans, is transferred to shallow vessels, and is allowed to cool and complete the crystallization which has already commenced. It is then cured, usually in centrifugal screens, in order to separate the molasses from the crystals. It is found impossible in practice to crystallize out of the syrup all the sugar which analysis showed it to contain in the beginning. Three principal causes contribute to this loss of crystallizable sugar, and consequent increase of molasses in the product: the potash and calcium salts present in the crude juice prevent the crystallization of a certain amount of sucrose or crystallizable sugar; the mere presence of a small amount of invert or noncrystallizable sugar or glucose seems to have the same effect; and the long continued heating of the sugar solutions has also the same effect.

The principal object of this invention is to keep down the percentage of molasses or invert sugar obtained; and by our process we have succeeded in obtaining a concentrated product which contains no greater quantity of invert sugar than was found in the original juice. That is, taking a juice containing about one-sixth sucrose and about one-half of one per cent. glucose the concentrated product obtained was found to show approximately three per cent. of invert. This result is accomplished by cutting down the length of time and preferably also the temperature of the concentrating process. Our improved process also carries away the acid which is generally present in greater or less quantities and avoids the necessity of neutralizing it by the addition of lime as is now common. The process besides being more efficient is also considerably cheaper than those at present in use, the necessary plant being less costly and the length of time used much less.

In carrying out our improved process the syrup or clarified juice is heated to vaporize it and at the same time air is blown through it which carries off the vapor as fast as it is formed and thus maintains the temperature of the mass much below the applied temperature. There is thus a considerable difference of temperature between the heating medium and the mass of syrup so that the temperature of the heating medium may be very high without injury. The communication of heat to the syrup is very rapid and consequently the vaporization is rapid and a high degree of concentration can be effected in a short time. The air is not introduced in fine jets, which we have found by experiment do not force their way rapidly through the thick syrup but gently agitate it and form a great accumulation of minute bubbles of foam, which retards the process and which by the comparatively slow aeration which is most favorable to fermentation tends to sour the syrup and to increase the invert; but is introduced in streams of considerable volume and pressure, a substantial depth of the syrup being carried in the vessel and the air being introduced preferably near the bottom so as to traverse as long a path as possible through the syrup and work with the greatest possible efficiency and in such a direction and with such force as to give the mass a rolling motion which liberates whatever bubbles are formed and further increases the length of the path of the air through the syrup. The heating medium may be steam or hot water applied preferably through coils or a jacket of the concentrating vessel and the temperature applied may vary within limits only determined by the volume and velocity of the air blast. Preferably the heat applied, when used in connection with the air blast, is such as to give a resultant temperature in the mass of from 140 to 160 degrees Fahrenheit. The use of water as a heating medium has the advantage that it permits not only the entire mass to be kept below the desired limit of temperature, but also the portions of the mass which happens to lie in contact with the heating surfaces for a length of time which with other heating mediums would result in burning them. Evaporation is thus effected while the mass is at a temperature below its normal vaporizing point without the use of expensive vacuum machines. The mass is reduced in this first step of the process preferably until it is too stiff to circulate with freedom so that the efficiency of the process is considerably reduced. For example it may be reduced to approximately one-fourth of its original volume by this first step. When the product becomes stringy and slow-running and so stiff as to make the continuation of the above described step inadvisable it is run into a drier where it is drawn out into a film and exposed to the action of air, preferably hot air. It may also be heated by water or steam at the same time. In this way the mass can be rapidly evaporated under the same conditions of low temperature as in the first stage of the process, though perhaps not so rapidly and not with such facility in the case of large volumes. The use of the two steps in combination makes it possible to handle large volumes of syrup with great rapidity, the first stage being specially adapted to a large volume of syrup in a very fluid state and the second stage being specially adapted to small volumes in a stiffer state; so that the syrup reduced and stiffened in the first stage is excellently fitted for the application of the second stage. Furthermore the concentration in two stages makes a substantially continuous process, a supply of fresh juice being under treatment according to the first stage of the process while the previous supply is under treatment by the second stage. In the second stage of the process the treatment is continued until the mass is reduced to crude sugar which may be subsequently refined by any usual or suitable processes.

The accompanying drawings illustrate a suitable apparatus (more or less diagrammatically) for carrying out the process. No claim is made in this application for the apparatus, and it is to be understood that the invention may be carried out in a great variety of apparatus other than that shown.

Figure 1:
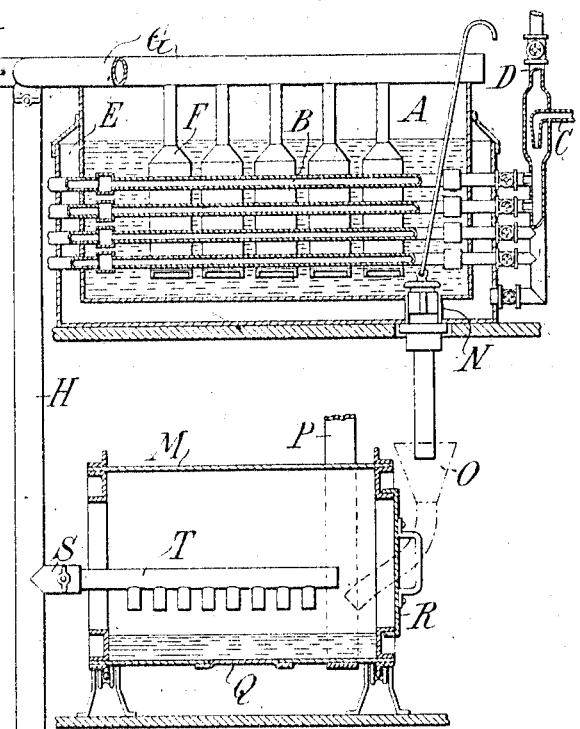
Figure 3:
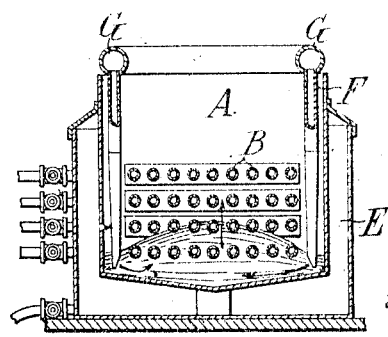
Figure 3:
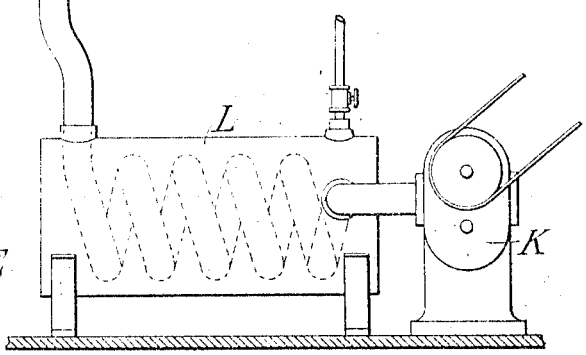

Figure 1 of the drawings is a vertical longitudinal section partly in elevation of the vessels in which the syrup may be treated and the means for obtaining a supply of hot or cold air under pressure. Fig. 2 is a vertical transverse section of the two vessels shown in Fig. 1. Fig. 3 is a transverse section of the first tank used, illustrating an intermediate stage of the process.

With this apparatus the clarified juice is placed in the vessel A preferably to a height slightly above the horizontal heating coils B. Steam is passed through the coils, entering through the pipe C. Or water alone may be introduced through the pipe D. Or a mixture of water and steam may be used by opening the valves in both pipes C and D, the temperature being controlled by the relative sizes of the openings in the two pipes. Preferably a jacket E is provided into which the heating medium also enters. Preferably each of the horizontal coils B is provided with a separate inlet valve so that as the level of the liquid falls the level of the heating medium may be similarly regulated. Preferably also the jacket E is provided with a number of outlets at different levels (Fig. 2) so that where hot water is used its level may be regulated to correspond with that of the syrup. Where steam is used the lowest outlet alone is necessary to get rid of the water of condensation. The air may be introduced through nozzles F extending nearly to the bottom of the vessel and having broad orifices so as to introduce the air in large streams rather than minute jets. The nozzles are supplied from branch pipes G which are connected to a main pipe H and to another main pipe J, the former supplying heated air and the latter air at atmospheric temperature, the air in each being preferably under a high pressure which may be secured by means of a pressure blower such as is shown at K, and the air for the hot air main H being passed through a coil in a steam drum L. The pressure or velocity of the air and the large size of the nozzles causes it to carry along with it the entire adjacent portion of the syrup and to give to the latter a rolling motion in the manner indicated by the dotted arrows, which turns the mass over and over and gives to whatever occluded bubbles are formed in the mass an opportunity to escape at the surface. The main volume of air takes the direction indicated by the full line arrows and carries away with it the vapors formed throughout the mass by the heat of the coils and jacket, or of the coils alone if the jacket be omitted. This process is continued, as before stated, until the syrup is reduced to (roughly) one-fourth of its original depth and volume and is so thick and of such slight depth in the vessel A as to make it impractical to continue the process further. Such a condition is indicated in Fig. 3. The mass is then run from the first tank A into a second vessel M for the carrying out of the second stage of the process. The tank A may be provided with a valve N through which the syrup can be run directly by means of a funnel O into the drum M. This drum is supported on roller bearings as shown and is rotated by means of a belt P. It is provided with a removable plate Q through which the final product may be extracted or through which the juice from the tank A may be admitted. When the juice is finally admitted into the drum M the cover R is replaced at one end and hot air is blown in through the branch S. The current of air is introduced preferably through a nozzle T having a series of radial branches, thus maintaining within the drum a desiccating atmosphere. The rotation of the drum at the same time constantly exposes a film or coating of the syrup on the wall of the drum from which the moisture is very rapidly extracted by the hot air. The air in the drum M and also that in the tank A may be previously dried if desired in order to heighten its evaporating effect. This operation is continued until there is substantially no water left in the mass. The mass is then scraped or otherwise removed from the sides of the drum. Where a good quality of syrup is used the final product is so little sticky that it falls from the wall of the drum even without scraping. In experimental tests which we have made the product has apparently contained even less invert sugar than was in the original juice.

The material in the drum may be heated in any manner, as for example by means of coils within or a jacket on the outside of the drum, in order to hasten the process.

The process is not only applicable to the concentration of the original juice, but may be substituted for the vacuum pan processes now generally used in the refining of crude sugar.

Though we have described with great particularity of detail a specific process embodying our invention, yet it is to be understood that the invention is not limited to the particular process described in detail. Various modifications may be made by those skilled in the art without departure from the invention.

What we claim is:—

1. In the concentration of syrup, the two-stage process which consists in first applying heat to the syrup and simultaneously passing air through it to effect a rapid concentration at a low temperature and thus keep down the formation of invert sugar, the air being introduced in large streams under pressure to avoid the formation of numerous minute bubbles and to hasten the process, and the air being also introduced in a direction to give the mass a rolling motion so as to liberate the bubbles formed, and then exposing the syrup thus concentrated in a film to a desiccating atmosphere to extract substantially all the remaining moisture.

2. In the concentration of syrup, the process which consists in applying heat to the syrup and simultaneously blowing air through it to effect a rapid concentration, the applied temperature and the volume of air being such as to maintain the mass at a temperature below about 160 degrees Fahrenheit, and exposing the syrup thus concentrated in a film to a desiccating atmosphere to extract substantially all the remaining moisture.

3. In the concentration of syrup, the process which consists in applying heat to the syrup and simultaneously passing air through it to effect a rapid concentration at a low temperature and thus keep down the formation of invert sugar, the air being introduced in large streams under pressure to avoid the formation of numerous minute bubbles and to hasten the process, hot water being used as the heating medium to avoid burning portions of the mass by contact with the heating surface, and exposing the syrup thus concentrated in a film to a desiccating atmosphere to extract substantially all the remaining moisture.

4. In the concentration of syrup, the process which consists in applying a large quantity of heat to the syrup and at once hastening the concentration and reducing the temperature by simultaneously passing air through it in large streams and in quantities sufficient to maintain the temperature of the syrup considerably below the applied temperature, the air being introduced in large streams under pressure, whereby the tendency of long continued and high heat to increase the quantity of invert sugar in the product is minimized and exposing the syrup thus concentrated in a film to a desiccating atmosphere to extract substantially all the remaining moisture.

5. In the concentration of syrup, the process which consists in applying heat to the syrup and simultaneously passing air through it to effect a rapid concentration at a low temperature, and thus keep down the formation of invert sugar, the air being introduced in large streams under pressure to avoid the formation of numerous minute bubbles and to hasten the process, and the air being also introduced in a direction to give the mass a rolling motion, so as to liberate the bubbles formed, and the application of heat and the temperature of the air being so proportioned as to maintain the mass at a temperature below about 160 degrees Fahrenheit, concentrating the syrup under such conditions until it is reduced to approximately one-fourth of its original volume, or until the mass is so thick as to render the action of the air inefficient, and drawing out the thick mass thus formed into a film, and exposing it to the action of currents of heated air until practically all of the remaining moisture has been extracted.

6. In the concentration of syrup, the process which consists in carrying a considerable depth of syrup in a vessel, applying heat to the syrup and simultaneously passing air through it in large streams from approximately the bottom of the vessel so as to secure a long path of the air through the syrup and to effect a rapid concentration at a low temperature and thus keep down the formation of invert sugar, using hot water as the heating medium so as to avoid burning portions of the mass in contact with the heating surfaces, containing this process until the syrup is reduced to such a slight depth and great thickness as to render the air blast inefficient, and exposing the syrup thus concentrated in a film to a desiccating atmosphere to extract substantially all the remaining moisture.

7. In the concentration of syrup, the process which consists in carrying a considerable depth of the syrup in a vessel, applying heat to the syrup and simultaneously passing air through it from approximately the bottom of the vessel so as to secure a long path of the air through the syrup and to effect a rapid concentration at a low temperature and thus keep down the formation of invert sugar, the air being introduced in large streams under pressure to avoid the formation of numerous minute bubbles and to hasten the process, and the air being also introduced in a direction to give the mass a rolling motion so as to liberate the bubbles formed, using hot water as the heating medium so as to avoid burning portions of the mass in contact with the heating surfaces, continuing this process until the syrup is reduced to such a slight depth and great thickness as to render the air blast inefficient, and exposing the syrup thus concentrated in a film to a desiccating atmosphere to extract substantially all the remaining moisture.

In witness whereof, we have hereunto signed our names in the presence of two subscribing witnesses.

JOSEPH H. CAMPBELL.
CHARLES H. CAMPBELL.

Witnesses:
THEODORE T. SNELL,
FRED WHITE.